US012467296B2

(12) United States Patent
Robert-Beaudoin et al.

(10) Patent No.: US 12,467,296 B2
(45) Date of Patent: *Nov. 11, 2025

(54) SHOWER DOOR HINGE ASSEMBLY

(71) Applicant: Maax Bath Inc., Lachine (CA)

(72) Inventors: Dominique Robert-Beaudoin, Boucherville (CA); Dominic Dion, Montréal (CA); Martin Desaulniers, Rosemère (CA)

(73) Assignee: Maax Bath Inc., Lachine (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,251

(22) Filed: Mar. 22, 2024

(65) Prior Publication Data

US 2024/0229528 A1 Jul. 11, 2024

Related U.S. Application Data

(63) Continuation of application No. 18/107,102, filed on Feb. 8, 2023, now Pat. No. 11,952,818, which is a (Continued)

(51) Int. Cl.

*E05D 5/02* (2006.01)
*E05D 3/02* (2006.01)
(Continued)

(52) U.S. Cl.

CPC ............. *E05D 5/0246* (2013.01); *E05D 3/02* (2013.01); *E05D 3/18* (2013.01); *E05D 5/125* (2013.01); *E05Y 2900/114* (2013.01)

(58) Field of Classification Search

CPC .. E05D 11/06; E05D 3/02; E05D 3/18; E05D 5/125; E05D 5/0246; E05D 5/06;
(Continued)

(56) References Cited

U.S. PATENT DOCUMENTS 2,583,950 A * 1/1952 Kirschner ............. E05D 7/0423 16/238
2,839,778 A * 6/1958 Hutchinson ........... E05D 7/0423 16/245
(Continued)

FOREIGN PATENT DOCUMENTS

DE 20302369 U1 * 5/2003 ............... A47K 3/30
DE 10310700 B3 * 5/2004 ........... E05D 5/0246
(Continued)

*Primary Examiner* — Chuck Y Mah

(74) *Attorney, Agent, or Firm* — Bradley Arant Boult Cummings LLP; Phillip E. Walker; Alex H. Huffstutter

(57) ABSTRACT

A hinge assembly includes a first hinged body, a pivot pin assembly, and a second hinged body. The first hinged body includes a channel. The pivot pin assembly includes a pin body configured to slideably engage the channel. The pivot pin assembly may be translated within the channel and adjustably secured along the channel. The pin body includes a downwardly extending pin. The second hinged body comprises a pin aperture configured to cooperatively receive the pin. The first hinged body and the second hinged body are configured to hingedly pivot along a hinge axis defined by the pin when the pin is received in the pin aperture. The pin body may include a pin body aperture configured to receive an alignment fastener such that the pin body may be tilt adjusted relative to the first hinged body.

19 Claims, 11 Drawing Sheets

Related U.S. Application Data continuation of application No. 17/381,144, filed on Jul. 20, 2021, now Pat. No. 11,702,873.

(60) Provisional application No. 63/054,175, filed on Jul. 20, 2020.

(51) Int. Cl.
*E05D 3/18* (2006.01)
*E05D 5/12* (2006.01)

(58) Field of Classification Search
CPC ..... E05D 2005/0261; E05D 2005/0269; E05F 1/1284; E05F 3/20; E05F 5/02; E05F 5/08; E05F 15/614; E05F 11/385; E05Y 2201/212; E05Y 2201/224; E05Y 2900/114; E05Y 2900/142; E05Y 2900/146; E05Y 2900/148; E05Y 2600/502; E05Y 2600/60; E06B 3/54; A47K 3/36; A47K 3/362; A47K 2003/367; A47F 3/12; A47F 3/125; Y10T 16/534; Y10T 16/541; Y10T 16/5257
See application file for complete search history.

(56) References Cited

U.S. PATENT DOCUMENTS

| | | | | | |
|---|---|---|---|---|---|
| 3,391,723 | A * | 7/1968 | Kirby | E05D 15/266 | 160/206 |
| 4,142,272 | A * | 3/1979 | Oogami | E05D 7/083 | 16/245 |
| 4,185,357 | A * | 1/1980 | Busse | E05D 5/08 | 16/265 |
| 4,209,946 | A * | 7/1980 | Akai | E05D 7/0423 | 16/245 |
| 5,088,154 | A * | 2/1992 | Ishikawa | E05D 7/0027 | 16/382 |
| 5,483,770 | A * | 1/1996 | Marinoni | E05D 7/0423 | 16/229 |
| 6,141,830 | A * | 11/2000 | Shimooka | E05D 7/0423 | 16/245 |
| 10,982,475 | B2 * | 4/2021 | Iwata | E05D 7/04 | |
| 2011/0024590 | A1 * | 2/2011 | Berger | E05D 5/0246 | 248/220.21 |
| 2011/0099755 | A1 * | 5/2011 | Reichel | E05F 1/063 | 16/382 |
| 2015/0113724 | A1 * | 4/2015 | Corpuz, Jr. | E05D 7/04 | 4/607 |

FOREIGN PATENT DOCUMENTS

| | | | | |
|---|---|---|---|---|
| EP | 2412905 | A2 * | 2/2012 | E05D 7/0423 |
| KR | 100329621 | B1 * | 3/2002 | |
| WO | WO-2004083579 | A1 * | 9/2004 | E05D 5/0246 |

* cited by examiner

SHOWER DOOR HINGE ASSEMBLY

CROSS-REFERENCE TO RELATED APPLICATIONS

This application is a continuation of U.S. patent application Ser. No. 18/107,102, filed Feb. 8, 2023, which is a continuation of U.S. patent application Ser. No. 17/381,144, filed Jul. 20, 2021, which claims the benefit of U.S. Provisional Patent Application No. 63/054,175, filed Jul. 20, 2020, each of which is relied upon for priority and incorporated by reference herein in the entirety.

TECHNICAL FIELD

The present disclosure relates to a hinge assembly. More specifically, the disclosure is directed towards a shower door hinge assembly that includes a first hinged body, a pivot pin assembly, and a second hinged body. The first hinged body comprises a channel configured to slideably engage the pivot pin assembly.

BACKGROUND OF INVENTION

Glass shower enclosures having minimal to no viewable frame supports have become, and continue to become, increasingly popular, as consumers desire aesthetically pleasing shower enclosures. However, while glass shower enclosure walls can be fixed to a floor or a wall, glass shower doors must open and close and cannot be fixedly secured. Moreover, because of the frequent use that glass shower doors can receive (more than daily) and the nature of their use (often bearing part of all of a person's body weight, especially if a person slips), glass shower doors must be highly secured and durable. Furthermore, often glass doors are secured to a neighboring glass wall, which may be suspectable to cracking or breaking.

Another problem facing glass shower enclosures is the fact, typically, preinstallation measurements must be done on-site. Then, glass shower pieces are cut off-site and brought and installed in-place. As glass shower pieces typically cannot be recut on-site, often there is a need to make adjustments due to inaccurate or incomplete measurements or practical difficulties with bathrooms in which glass showers may be installed (such as unlevel floors, unlevel ceilings, unlevel walls, imperfect corners, etc.). Therefore, a need exists for a hinge mechanism for glass shower doors that are mechanically strong, durable, does not loosen over time, water-resistant or water-tight, can be secured to a neighboring glass wall, and enables adjustments during installation.

BRIEF SUMMARY

In one aspect, a hinge assembly is disclosed. The hinge assembly comprises a first hinged body including a channel. The channel may comprise one or more channel apertures. The hinged assembly comprises a pivot pin assembly including a pin body configured to slideably engage the channel.

The pin body includes a pin. The pin body may include a channel engagement portion having a pin body aperture. The channel engagement portion may comprise opposite side surfaces and a threaded aperture may extend through the channel engagement portion to the opposite side surfaces. The hinge assembly may include a threaded fastener configured to be cooperatively received in the threaded aperture. The threaded fastener may include a tip and a head.

The hinge assembly may include a restriction nut including a restriction nut aperture configured to receive the threaded fastener. The hinge assembly may include a tip end cap including a tip receptacle configured to receive at least a portion of the tip. The hinge assembly may include a head end cap including a head end cap aperture configured to receive the threaded fastener. The head end cap may include a head opening for receiving the head of the threaded fastener. The first hinged body may include a first end and a second end, each of the ends comprising one or more holes. The tip end cap and the head end cap each include one or more corresponding holes, wherein the one or more holes and the one or more corresponding holes are configured to align when the pin body, tip end cap, and the head end cap are each engaged with the threaded fastener. When the threaded fastener is rotated, the threaded fastener may cooperatively engage the threaded aperture and translate the pin body along the channel.

The pin body aperture and the one or more channel apertures may selectively align when the pin body is translated along the channel. The hinge assembly may include an alignment fastener configured to extend through the pin body aperture and one of the one or more channel apertures to adjust the tilt of the pin body relative to the first hinged body. The hinge assembly includes a second hinged body comprising a pin aperture configured to receive the pin. The pivot pin assembly may include a hollow pivot bushing configured to cooperatively receive the pin and be cooperatively received in the pin aperture.

The first hinged body may comprise a front surface including one or more gasket apertures. The hinge assembly may comprise a first gasket plate including one or more gasket plate apertures. The hinge assembly may comprise a first backplate including one or more protrusions configured to be received in the one or more gasket plate apertures. The one or more protrusions may include a protrusion aperture. The hinge assembly may include one or more fasteners configured to be disposed through the protrusion aperture and the gasket apertures of the front surface to releasably secure the first backplate, the first gasket plate, and the first hinged body. The hinge assembly may comprise a first cover plate configured to be releasably secured (such as slideably engaged or via a friction fit) with the first backplate. The hinge assembly may comprise a first cover configured to be releasably secured (e.g., friction fit or slideably engaged) with the first hinged body and the pin body.

The second hinged body may comprise a front surface including one or more gasket apertures. The hinge assembly may comprise a second gasket plate including one or more gasket plate apertures. The hinge assembly may comprise a second backplate comprising one or more protrusions configured to be received in the one or more gasket plate apertures, the one or more protrusions comprising a protrusion aperture. The hinge assembly may comprise one or more fasteners configured to be disposed through the protrusion aperture and the gasket apertures to releasably secure the second backplate, the second gasket plate, and the second hinged body. The hinge assembly may comprise a second cover plate configured to be releasably secured (e.g., friction fit or slideably engaged) with the second backplate.

The first hinged body and the second hinged body are configured to hingedly pivot along a hinge axis defined by the pin when the pin is received in the pin aperture.

In an aspect, a shower door assembly comprises at least one hinge. The at least one hinge comprises a first hinged body including a channel, a pivot pin assembling including a pin body configured to slidably engage the channel and having a pin, and a second hinged body comprising a pin aperture configured to receive the pin. The shower door assembly comprises the first gasket plate having first and second gasket plate apertures. The shower door assembly comprises a first backplate comprising first and second protrusions configured to be received in the first and second gasket plate apertures, respectively, the first and second protrusions each comprising a protrusion aperture.

The shower door assembly comprises a second gasket plate comprising third and fourth gasket plate apertures. The shower door assembly comprises a second backplate comprising third and fourth protrusions configured to be received in the third and fourth gasket plate apertures, respectively, the third and fourth protrusions each comprising a protrusion aperture. The shower door assembly comprises third and fourth fasteners configured to be disposed through the third and the fourth protrusion apertures, respectively, the third and fourth protrusions each comprising a protrusion aperture. The shower door assembly comprises first and second fasteners configured to be disposed through the first and the second protrusion apertures, respectively, to releasably secure the first backplate, the first gasket plate, and the first hinged body. The shower assembly comprises third and fourth fasteners configured to be disposed through the third and the fourth protrusion apertures, respectively, to releasably secure the second backplate, the second gasket plate, and the second hinged body. The shower door assembly comprises a glass door panel disposed between the first backplate and the first gasket plate. The shower door assembly comprises a fixed glass wall disposed between the second backplate and the second gasket plate.

BRIEF DESCRIPTION OF DRAWINGS

It should be noted that identical features in different drawings are shown with the same reference numeral.

DETAILED DESCRIPTION

Figure 1:
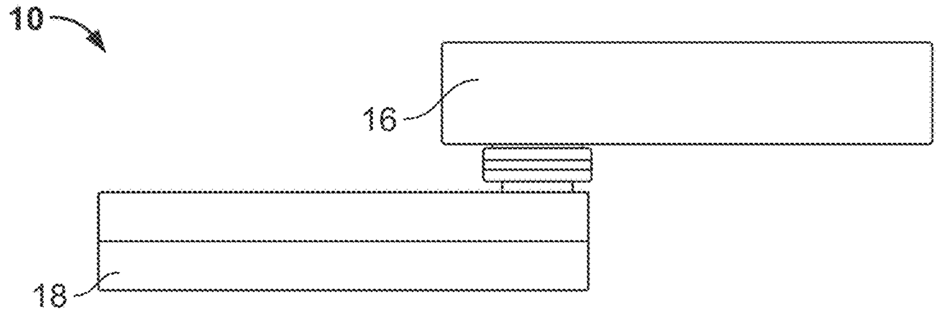
FIG. 1 shows a front elevation view of one embodiment of a hinge assembly.

Reference now will be made in detail to the embodiments of the present disclosure. It will be apparent to those of ordinary skill in the art that various modifications and variations can be made to the teachings of the present disclosure without departing from the scope of the disclosure. For instance, features illustrated or described as part of one embodiment can be used with another embodiment to yield a further embodiment.

Thus, it is intended that the present disclosure covers such modifications and variations as come within the scope of the appended claims and their equivalents. Other objects, features, and aspects of the present disclosure are disclosed in or are apparent from the following description. It is to be understood by one of ordinary skill in the art that the present disclosure is a description of exemplary embodiments only and is not intended as limited the broader aspects of the present disclosure.

For the sake of clarity, not all reference numerals are necessarily present in each drawing Figure. In addition, positional terms such as “upper,” “lower,” “side,” “top,” “bottom,” “vertical,” “horizontal,” etc. refer to the hinge assembly and shower door assembly when in the orientation shown in the drawings. The skilled artisan will recognize that hinge assembly and shower door assembly can assume different orientations when in use.

Referring to FIGS. 1-12B, a hinge assembly 10 is disclosed. The hinge assembly 10 may be used on doors 12, particularly glass doors, such as glass shower doors. The hinge assembly 10 enables the door 12 to pivotably open and close with a fixed wall 14, such as a fixed glass wall typically found in shower enclosures. Advantageously, the hinge assembly 10 of the present disclosure allows for convenient adjustments while securely supporting the door and being attractive, and importantly, water-resistant.

The hinge assembly 10 may comprise a first hinged body 16 and a second hinged body 18. The first hinged body 16 may also be referred to as the “upper hinged body” and the second hinged body 18 may also be referred to as the “lower hinged body,” as when installed, the first hinged body 16 may be disposed generally above the second hinged body 18, as shown. The hinge bodies 16, 18 may be elongated and rectangular in profile. The hinge bodies 16, 18 may be constructed of any suitable material, such as one or more metals or alloys (e.g., stainless steel, brass, or aluminum) or a polymer.

Figure 2:
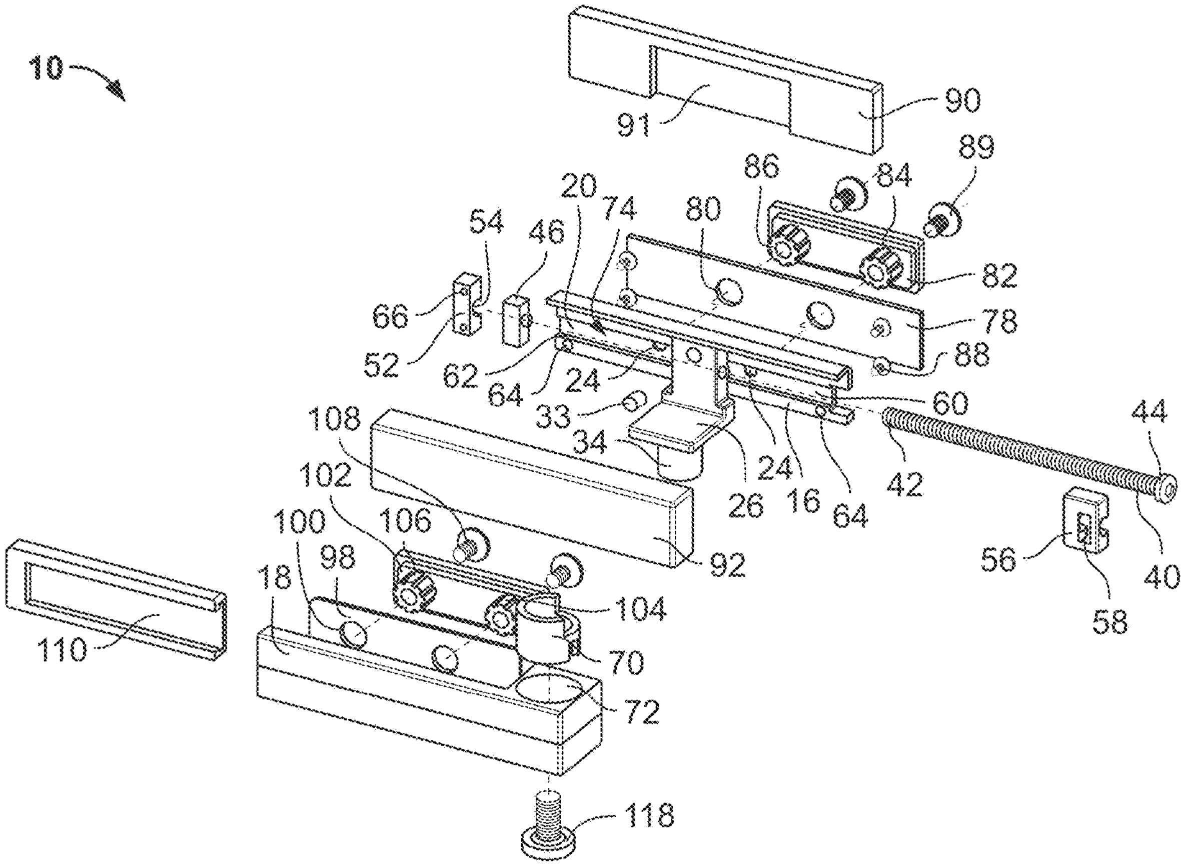
FIG. 2 shows an exploded view of the hinge assembly shown in FIG. 1.
Figure 3:
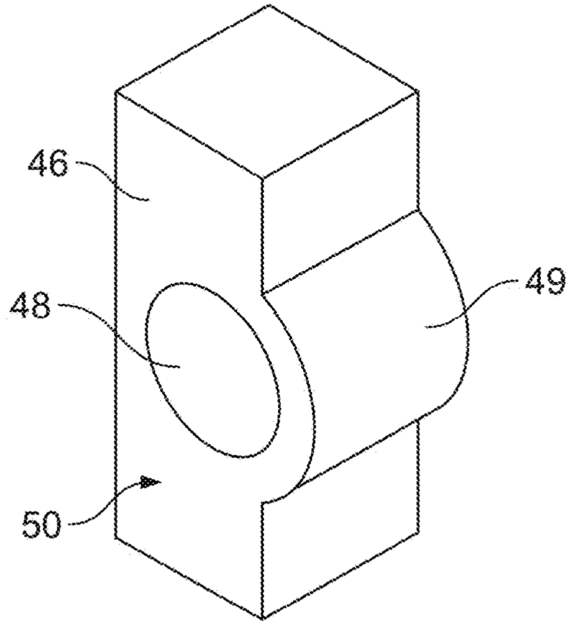
FIG. 3 shows a front perspective view of an embodiment of a restriction nut.
Figure 4A:
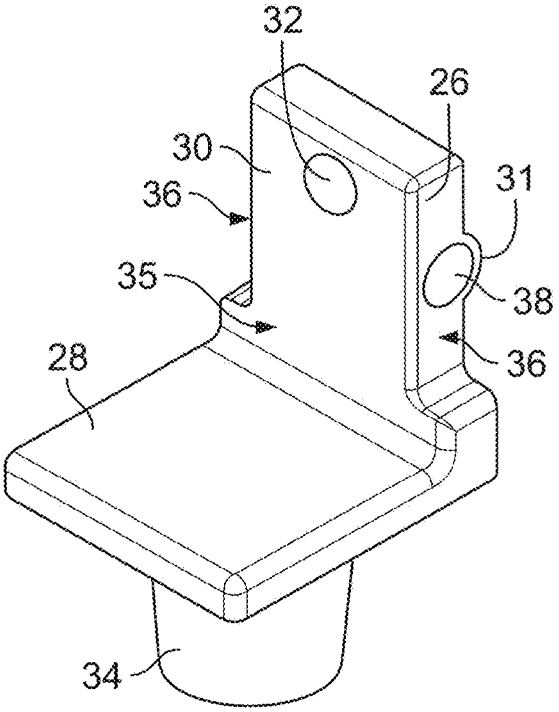
FIG. 4A shows a front perspective view of an embodiment of a pivot pin assembly.
Figure 4B:
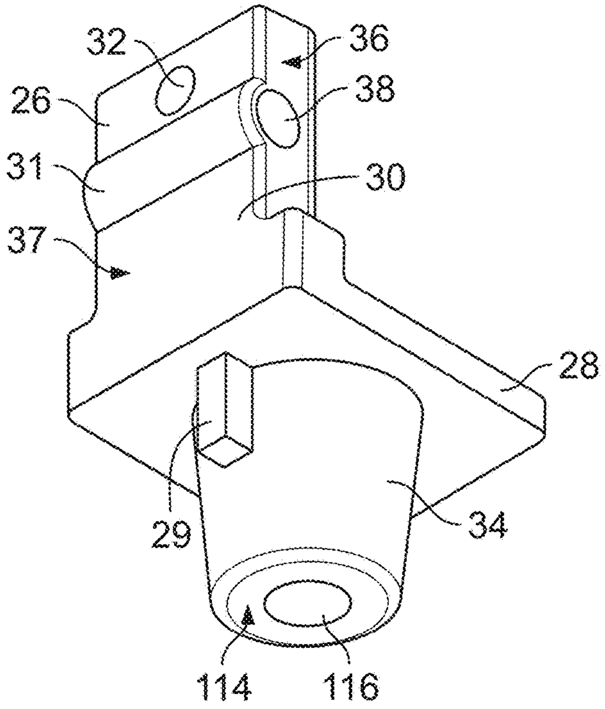
FIG. 4B shows a rear perspective view of the pivot pin assembly of FIG. 4A.
Figure 4C:
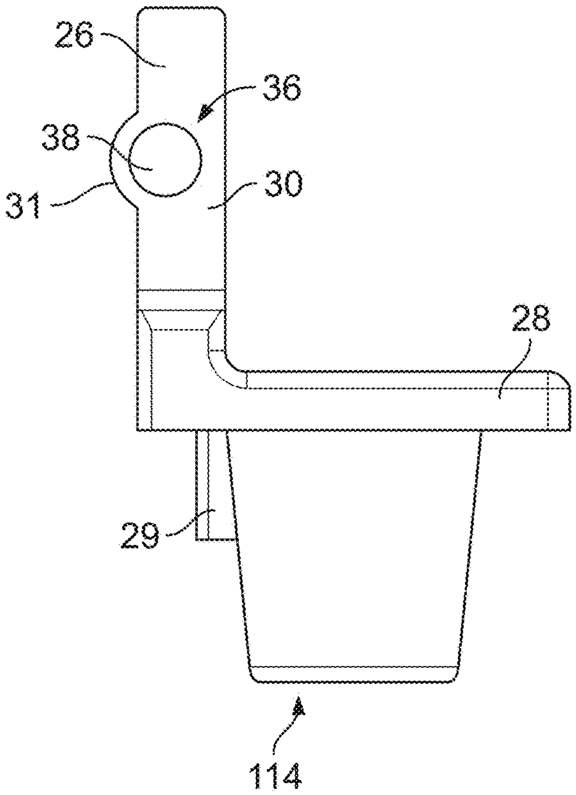
FIG. 4C shows a right view of the pivot pin assembly of FIG. 4A.
Figure 4D:
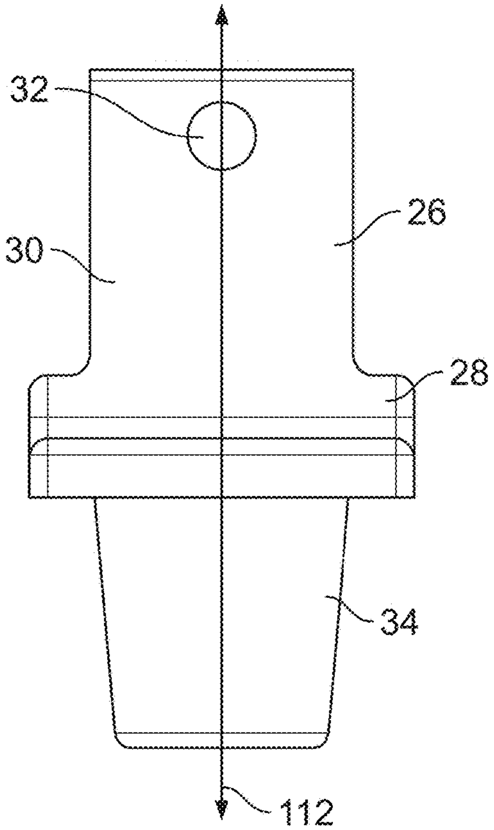
FIG. 4D shows a rear view of the pivot pin assembly of FIG. 4A.
Figure 4E:
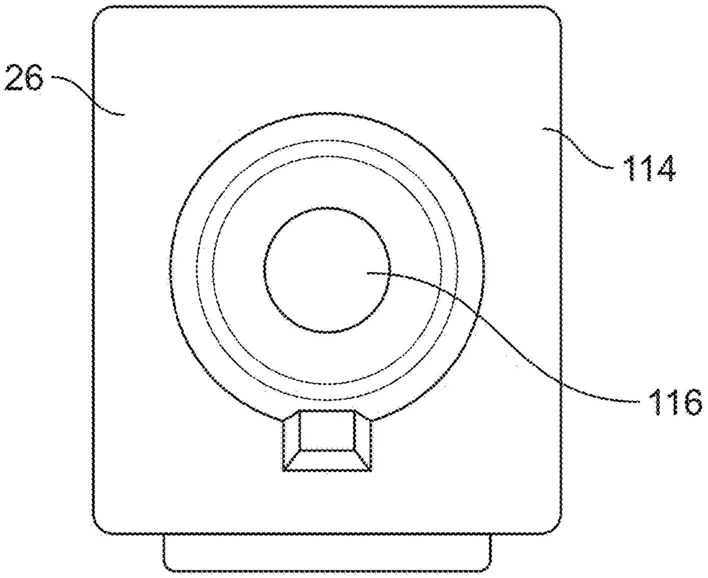
FIG. 4E shows a bottom view of the pivot pin assembly of FIG. 4A.
Figure 8A:
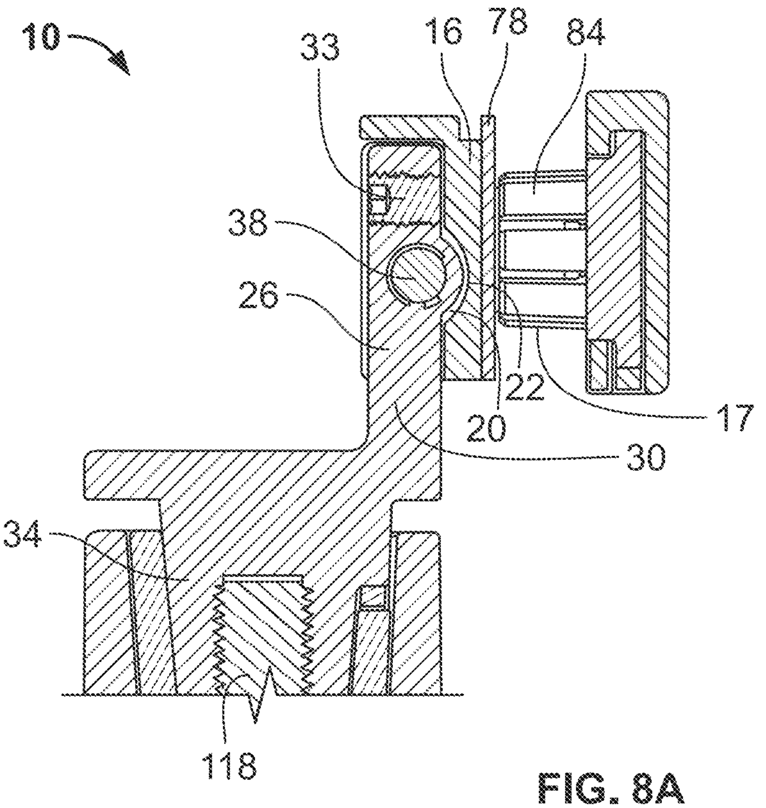
FIG. 8A shows a right side cutaway view of a hinge assembly according to an embodiment.

Referring to FIGS. 2 and 8, the first hinged body 16 may comprise a channel 20 disposed along the elongated body 16. The channel 20 may be defined by one or more channel surfaces 22 (such as a curved indentation, as shown in FIG. 8A as having a continuously curved inwardly (e.g., concave) profile extending lengthwise along the elongated body 16. The channel 20 may comprise one or more channel apertures 24. The channel apertures 24 may be disposed in various positions along the length of the channel 20.

Referring to FIGS. 4A-5H, the hinge assembly may comprise a pivot pin assembly 26. The pivot pin assembly 26 may comprise a pin body 28. The pivot pin assembly 26 may comprise a channel engagement portion 30 (e.g., a channel engagement wall 30) extending upwardly from the pin body 28. The channel engagement portion 30 may be configured to slideably engage the channel 20 such that the pin body 28 may freely translate along the channel 20 lengthwise. By way of example, the pin body may comprise an annular portion 31 shaped complementarily with the one or more channel surfaces 22. The channel engagement portion 30 may comprise a threaded pin body aperture 32 extending from a front surface 35 to a rear surface 37 of the channel engagement portion 30 such that an alignment fastener 33, such as a screw, bolt, or hex, may pass through aligned pin body aperture 32 and channel aperture 24, thereby allowing for tilt adjustment of the pin body 28 in the channel 20. By way of example, the alignment fastener 33 may be a threaded hex screw such that when the alignment fastener 33 is screwed into the pin body aperture 32 that is cooperatively threaded, the tilt of the pin body 28 may be adjusted by the distance the hex screw extends beyond the pin body aperture 32 on the channel side of the body pin 28. If more tilt is desired, the hex screw may be turned (typically clockwise) so that the hex screw extends a greater distance, and if less tilt is desired, the hex screw may be turned (typically counterclockwise) so that the hex screw extends a lesser distance. This tilt adjustment feature allows the door 12 to remain in the desired upright orientation. The pin body 28 may comprise a pin 34 extending downwardly from the pin body 28 and orthogonally from the translation direction of the channel 20. The pin 34 may taper inwardly as it extends downwardly. The pin 34 may have a frustoconical profile.

The channel engagement portion 30 may comprise opposite side surfaces 36. A threaded aperture 38 may extend lengthwise through the channel engagement portion extending from one opposite side surface 36 to the other opposite side surface 36. The hinge assembly 10 may include a threaded fastener 40 (such as a bolt or a screw) configured to cooperatively received in the threaded aperture 38. The threaded fastener 40 may include a tip 42 and a head 44. The tip 42 and the head 44 may be configured to engage a tool, such as a wrench, a hex key, or a screwdriver. The threaded fastener 40 may have a length that is equal, or approximately equal, to the length of the channel 20. Beneficially, the hinge assembly 10 can be securely adjusted during and after installation, including significant adjustments (up to 6-8 centimeters) to eliminate consequences of measuring mistakes and additionally allow for easy adjustments of the relative position of the hinged door 12 in relation to the wall 14. By rotating the channel fastener 40 (such as with a hex key or a flat screwdriver), the threaded pin body aperture 38 engages with the threads of the threaded fastener 40 and translates lengthwise across the channel 20 to one side or another depending on whether the channel fastener 40 is rotated clockwise or counterclockwise.

The hinge assembly 10 may include a restriction nut 46. The restriction nut 46 may include a restriction nut aperture 48 disposed in a fastener side or surface 50 of the restriction nut 46. The restriction nut 46 may comprise a channel engagement portion 49 shaped complementary to the channel 20 (e.g., the channel surfaces 22). The restriction nut aperture 48 may be dimensioned to receive the threaded fastener 40. The restriction nut aperture 48 may be threaded or unthreaded. The restriction nut 46 may positionally secure the threaded fastener 40 while acting as a stop for the pin body 28. In some embodiments, the restriction nut 46 is constructed of a suitably rigid but soft material (such as nylon) such that the threaded fastener 40 may self-tap into the restriction nut 46, even so as to create or complete the restriction nut aperture 48. The self-tapped threaded fastener 40 into the restriction nut 46 is mechanically strong so that the fastener 40 does not become disengaged when the assembly 10 is in use and allows the hinge assembly 10 to remain adjustable while enabling the hinge to stay tightened (not loosen) over time.

The hinge assembly 10 may comprise a tip end cap 52 that includes a tip receptacle 54 configured to receive at least a portion of the tip 42 of the threaded fastener 40 to secure the threaded fastener 40. The hinge assembly 10 may include a head end cap 56 that comprises a head opening 58 configured to receive the head 44 of the threaded fastener 40. The first hinged body 16 may comprise a first end 60 and a second end 62 disposed oppositely on the body 16 from the first end 60. The ends 60, 62 may each comprise one or more end holes 64. The tip end cap 52 may be configured to align with the channel apertures 24 such that the tip end cap 52 and/or the head end cap 56 may be securely and releasably fastened with the first hinged portion 16 with a hinge body fastener 88. Advantageously, the tip receptacle 54 and the head opening 58 (which may also be referred to as the “head receptable”) may not be threaded and freely allow the fastener to turn while securing the threaded fastener 40 with the first hinged body 16. The end holes 64 corresponding holes 66 of the tip end cap 52 and/or head end cap 56 may align when engaged via the threaded fastener 40 and can be securely fastened via the fasteners 88.

The pin assembly 26 may include one or more hollow pivot bushings 70 configured to cooperatively receive the pin 34 at least partially within a cooperative and complementary-shaped bushing aperture 75. The pivot bushing 70 may have a left configuration (shown in FIGS. 5A-5D and 5F) or a right configuration (shown in FIGS. 5E and 5H) for the left open door 12 or the right open door 12, respectively. In some embodiments, both right and left configurations of pivot bushings 70 are included in the assembly 10. The pivot bushing may include an indicator 67, such as disposed on the bottom of the bushing 70, to indicate whether the pivot bushing 70 is a left (such as the letter "L") or right configuration (such as the letter "R").

Figure 5A:
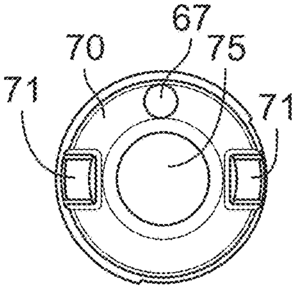
FIG. 5A shows a bottom view of a pivot bushing having a left configuration according to an embodiment of a pivot pin assembly.
Figure 5B:
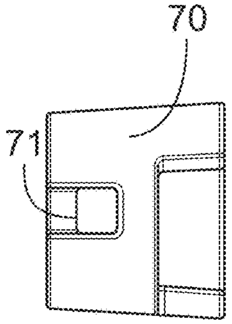
FIG. 5B shows a right view of the pivot bushing of FIG. 5A.
Figure 5C:
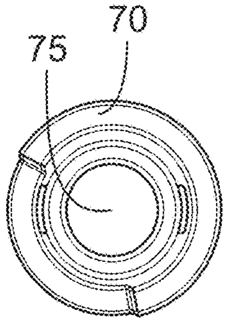
FIG. 5C shows a bottom view of the pivot bushing of FIG. 5A.
Figure 5D:
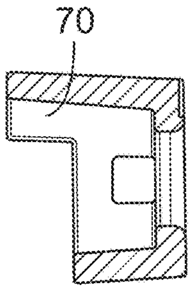
FIG. 5D shows a left cross-sectional view of the pivot bushing of FIG. 5A.
Figure 5E:
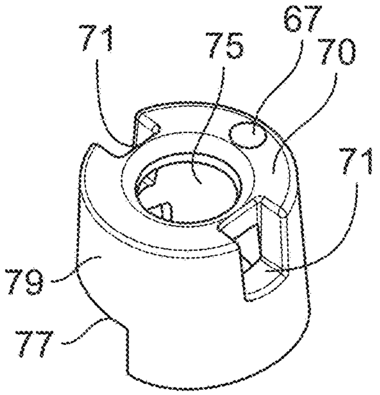
FIG. 5E shows a front perspective view of a pivot bushing having a right configuration according to an embodiment of a pivot pin assembly.
Figure 5F:
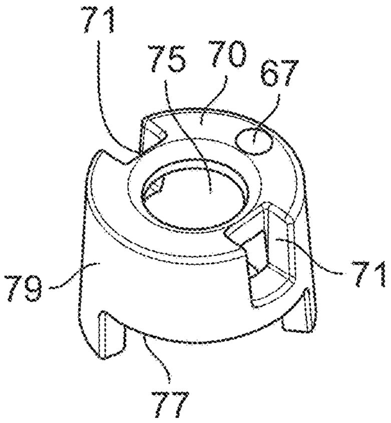
FIG. 5F shows another front perspective view of the pivot bushing of FIG. 5A.
Figure 5G:
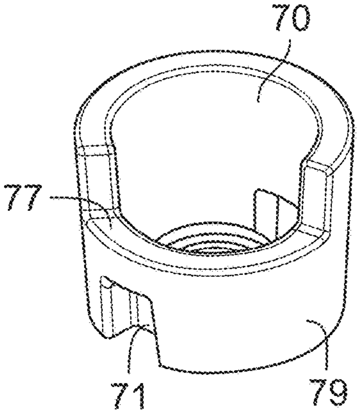
FIG. 5G shows a rear perspective view of the pivot bushing of FIG. 5A.
Figure 5H:
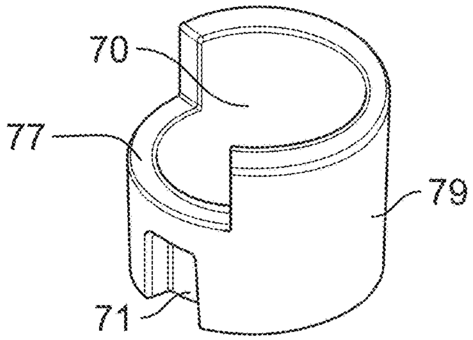
FIG. 5H shows a rear perspective view of the pivot bushing of FIG. 5E.
Figure 6A:
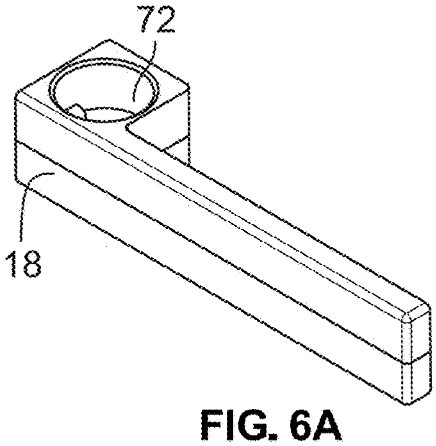
FIG. 6A shows a front perspective view of a second hinged body according to an embodiment of a pivot pin assembly.
Figure 6B:
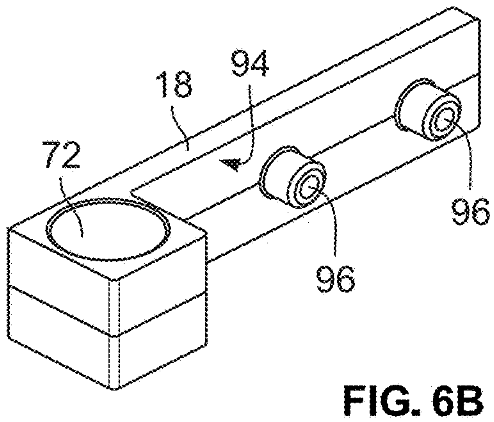
FIG. 6B shows a rear perspective view of the second hinged body of FIG. 6A.
Figure 6C:
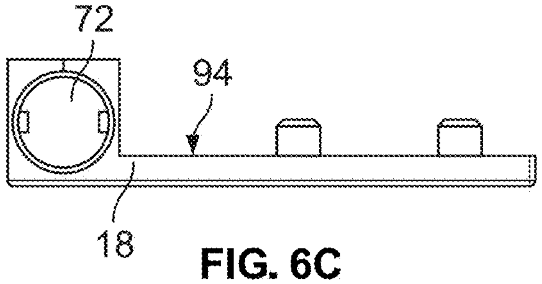
FIG. 6C shows a top view of the second hinged body of FIG. 6A.
Figure 6D:
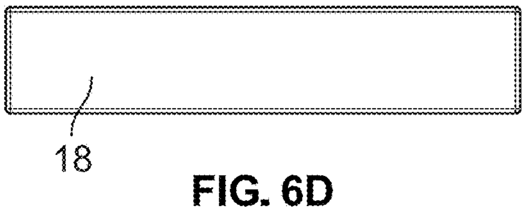
FIG. 6D shows a front elevation view of the second hinged body of FIG. 6A.
Figure 6E:
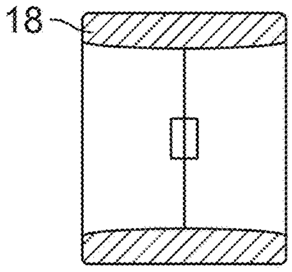
FIG. 6E shows a cross-sectional side view of the second hinged body of FIG. 6A.
Figure 6F:
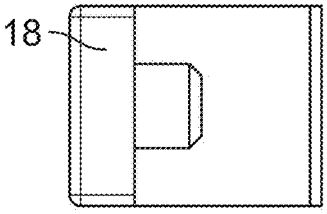
FIG. 6F shows a side view of the second hinged body of FIG. 6A.
Figure 6G:
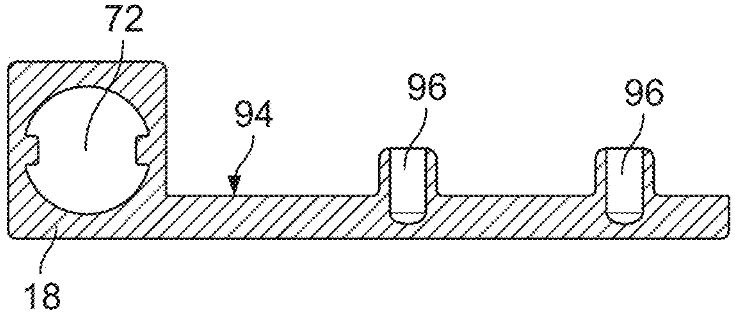
FIG. 6G shows a cross-sectional top view of the second hinged body of FIG. 6A.
Figure 7A:
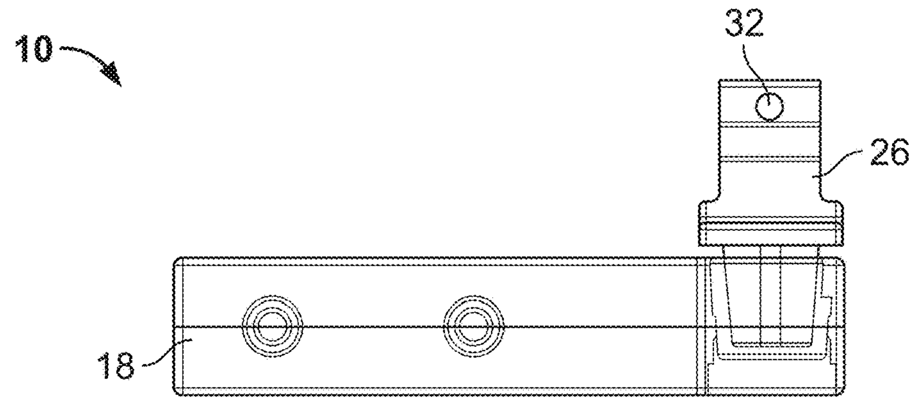
FIG. 7A shows an elevation cutaway view of an embodiment of the hinge assembly.
Figure 7B:
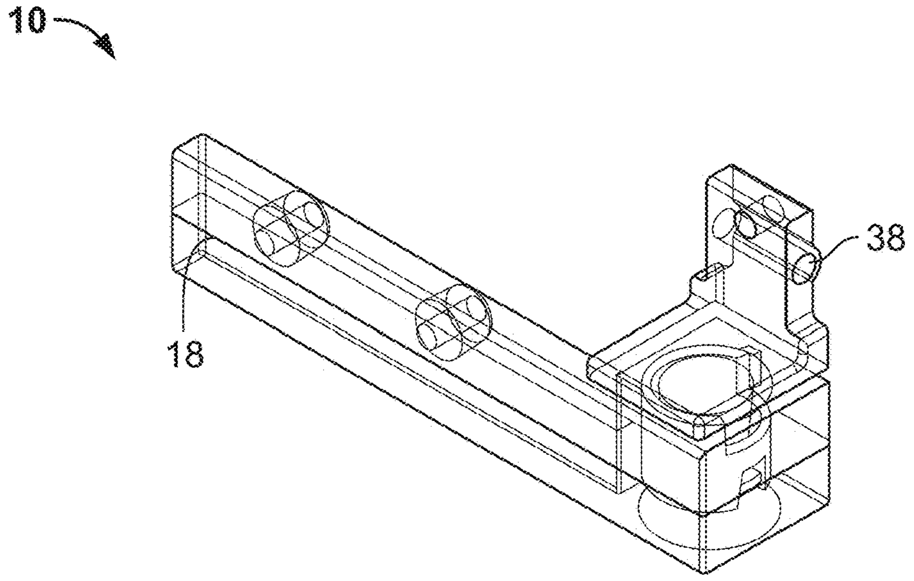
FIG. 7B shows a front perspective cutaway view of the hinge assembly of FIG. 7A.
Figure 7C:
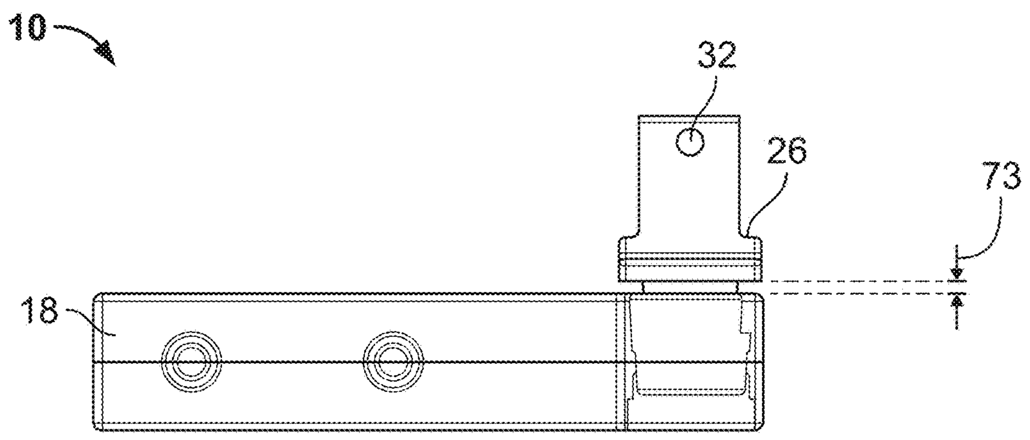
FIG. 7C shows another elevation cutaway view of the hinge assembly of FIG. 7A.
Figure 7D:
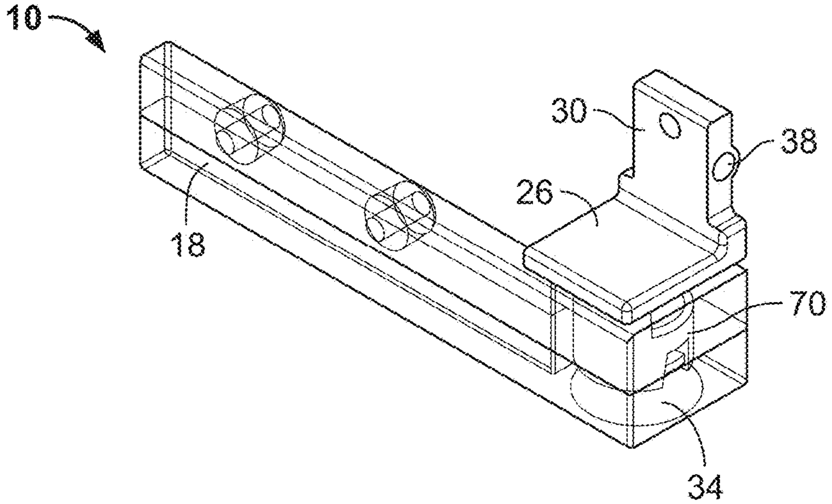
FIG. 7D shows another front perspective cutaway view of the hinge assembly of FIG. 7A.
Figure 7E:
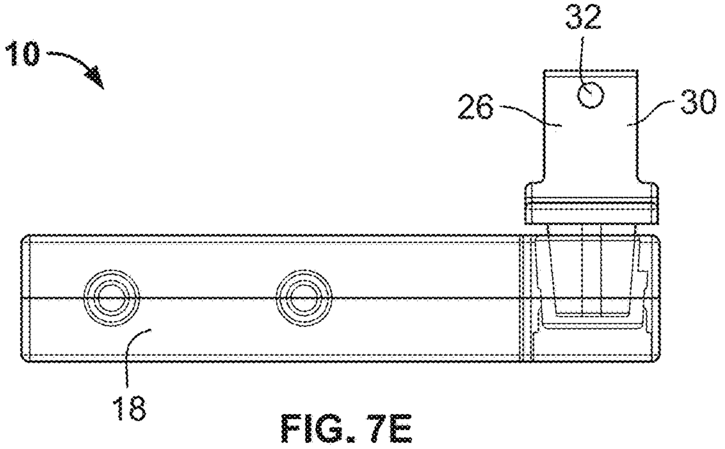
FIG. 7E shows another elevation cutaway view of the hinge assembly of FIG. 7A.
Figure 7F:
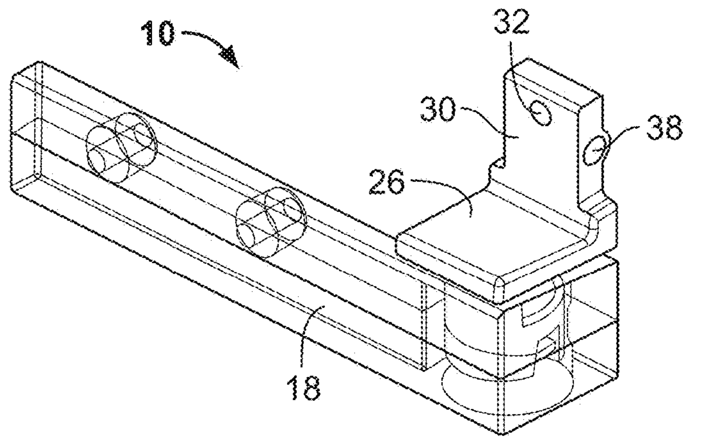
FIG. 7F shows another front perspective cutaway view of the hinge assembly of FIG. 7A.
Figure 7G:
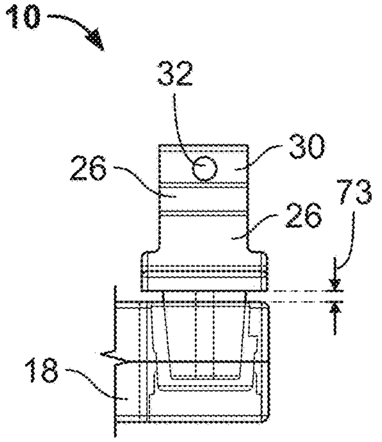
FIG. 7G shows another front cutaway view of the hinge assembly of FIG. 7A.

The second hinged body 18 may comprise a pin aperture 72 configured and dimensioned to receive the pin 34 (including the pin 34 when disposed within the pivot bushing 70). Accordingly, the pivot bushing 70 may be configured to be cooperatively received within the pin aperture 72. The pin body 28 may be maintained a distance 73 above the pivot bushing 70. The pivot bushing 70 may comprise a cutaway portion 77 formed in a sidewall 79 that partially circumscribes the pivot bushing 70. The pin body 28 may comprise a boss 29 configured to be cooperatively received by the cutaway portion 77. The boss 29 may slide across at least a portion of the cutaway portion as the pin is rotated within the bushing. Accordingly, the length and position of the cutaway portion 77 in the sidewall 79 may define the opening angles of the door 12. The right and left configurations of the bushings 70 differ in that each have the recess disposed on opposite sides of the cutaway portion 77, as can be seen in FIG. 5G (left configuration) and 5H (right configuration).

Figure 12A:
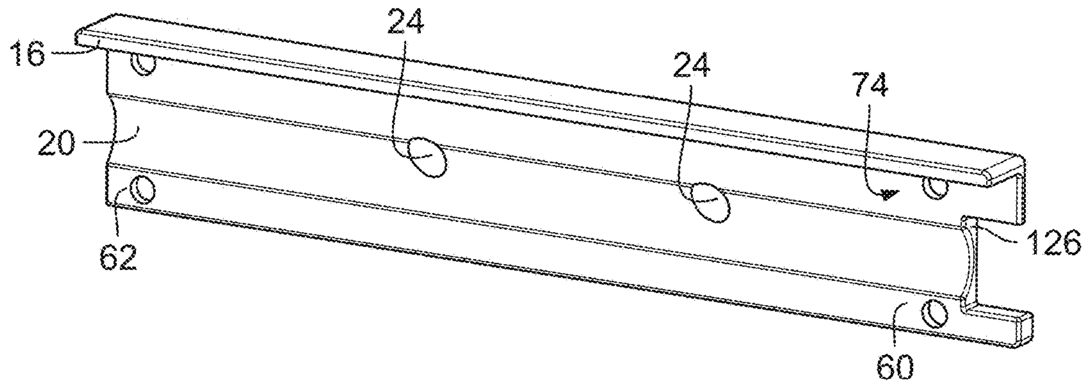
FIG. 12A shows a front perspective view of a first hinged body according to an embodiment.
Figure 12B:
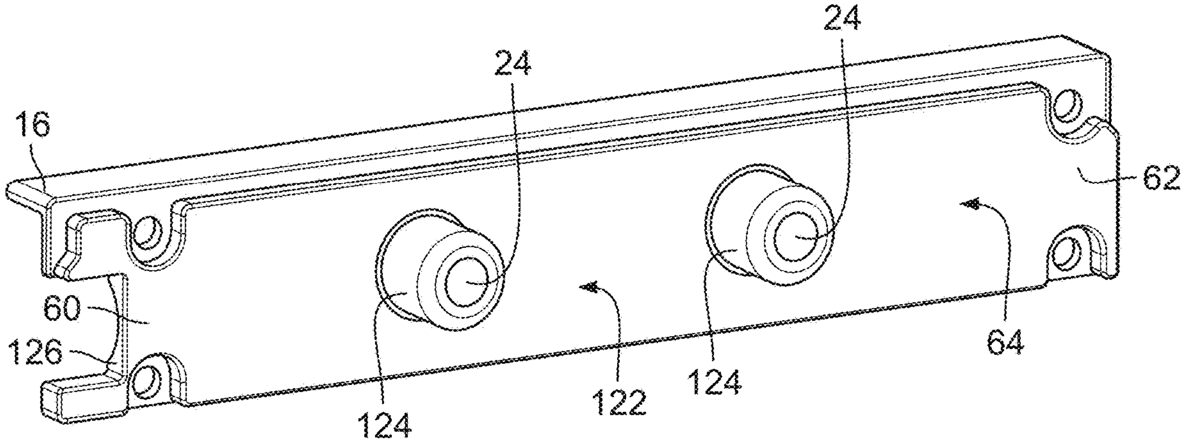
FIG. 12B shows a rear perspective view of the first hinged body of FIG. 12A.

As shown in FIGS. 12A and 12B, the first hinged body 16 may comprise a back surface 74 including the channel apertures 24 disposed therethrough to oppositely disposed front surface 122. One or more projections 124 may extend from the front surface 112 and further define the channel apertures 24. The first body 16 may include an indentation 126 in the first end 60, which may be shaped to partially receive the head 44 of fastener 40, such that the head 44 may be rotatable, as described, above. The hinge assembly 10 may comprise a first gasket plate 78 that includes one or more gasket plate apertures 80 disposed therethrough.

The hinge assembly 10 may comprise a first backplate 82 including one or more gasket protrusions 84 that are configured to be received in the one or more gasket plate apertures 80. The one or more gasket protrusions 84 may be configured to cooperative receive, or be received on, the one or more projections 124 of the first hinged body 16. The one or more gasket protrusions 84 may each include a gasket protrusion aperture 86. The hinge assembly 10 may include one or more gasket fasteners 89 configured to be disposed through the gasket protrusions 84, the gasket protrusion aperture 80, and the channel apertures 24 to releasably secure the first backplate 82, the first gasket plate 78, and the first hinged body 16. The hinge assembly 10 may comprise a first cover plate 90 configured to be releasably secured, such as slideably engaged or secured with a friction fit (such as via fit element 91) with the first backplate 82. The first cover plate 90 may conceal components of the assembly 10 such that the hinge has an aesthetically pleasing view when installed, yet is removable for access to the components of the hinge assembly 10 for adjustment. The hinge assembly 10 may comprise a first back cover 92 configured to be releasably secured (e.g., friction fit or slideably engaged) with the first hinge body 16 and the pin body 28. The first cover 92 may conceal the components of the assembly 10 such that the back view of the installed assembly 10 has an aesthetically pleasing appearance.

The second hinged body 18 may comprise a back surface 94 including one or more gasket apertures 96 disposed therethrough. The hinge assembly 10 may comprise a second gasket plate 98 including one or more gasket plate apertures 100 disposed therethrough. The hinge assembly 10 may comprise a second backplate 102 comprising one or more gasket protrusions 104 configured to be received in the one or more gasket plate apertures 100, the gasket protrusions 104 each comprising a gasket protrusion aperture 106 disposed therethrough. The assembly 10 may include one or more gasket protrusion fasteners 108. The gasket protrusion fasteners may be the same as the gasket fasteners 89. Each fastener 108 may be configured to be disposed through, and cooperate with (such as threadingly), the gasket protrusion aperture 106 and the gasket apertures 96 to releasably secure the second backplate 102, the second gasket plate 98, and the second hinged body 18. In this manner, the gasket protrusions 84, 104, of the first hinged body 16 and the second hinged body 18, respectively, allow for the hinged bodies 16, 18 to interface with and secure the door 12 and the wall 14 in a water-resistant manner that prevents, or resists, water from passing from one side of the door 12 or the wall 14 to the other. The hinge assembly 10 may comprise a second cover plate 110 configured to be releasably secured (e.g., friction fit, slideably engaged, or fastened) with the second backplate 102. The second cover plate 110 conceals the components (e.g., the second gasket plate) such that the hinge assembly 10 is aesthetically pleasing.

When in use, the first hinged body 16 and the second hinged body 18 are configured to hingedly pivot relative to one another along a hinge axis 112 defined by the pin 34 when the pin 34 is received in the hollow pivot bushing 70, thus enabling the door 12 to hingedly open and close relative to the wall 14. The pin 34 may comprise a bottom surface 114 having a threaded aperture 116 disposed therethrough such that a pin fastener 118 (e.g., a screw, hex, nut) can secure the pin 34 within the pivot bushing 70 and the pin aperture 72. Beneficially, the pivot bushing 70, pivot pin assembly 26, and pin fastener 118 do not permit the secured (i.e., fastened) pivot pin assembly 26 to escape (i.e., jump) out the pivot bushing 70 and the pin aperture 72 if upward force is exerted on the secured hinge assembly 10 (such as an upward force on the door 12 when the hinge assembly 10 is installed), which is an important safety feature for glass shower doors. Moreover, the pivot bushing 70, pivot pin assembly 26, and the pin aperture 72 allow for a smooth hinge motion when opening and closing the door 12.

Figure 8B:
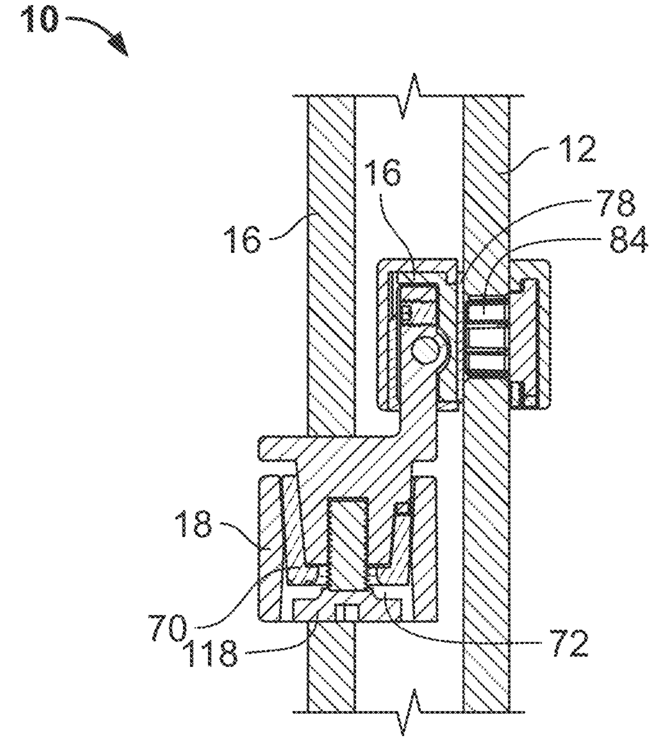
FIG. 8B shows a right side cutaway view of a hinge assembly according to another embodiment.
Figure 9:
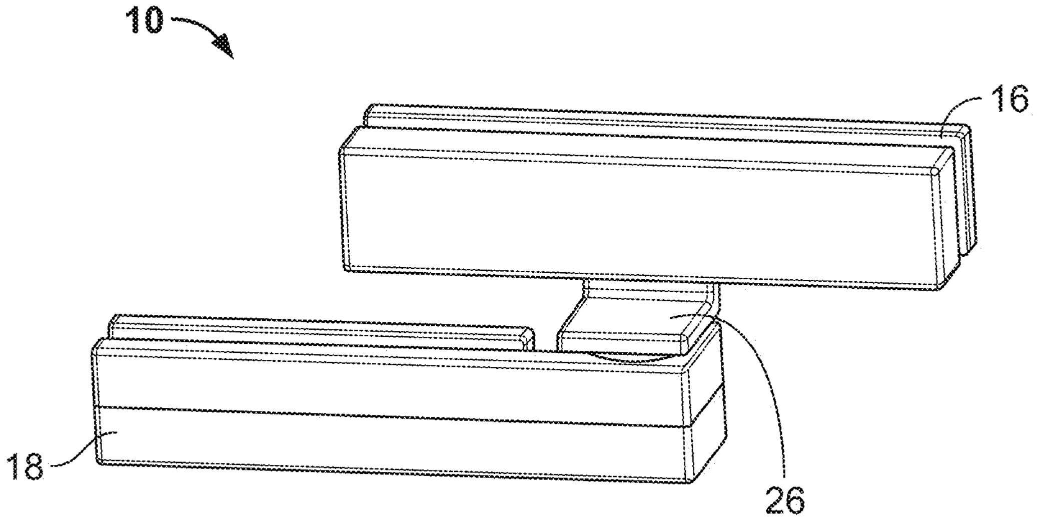
FIG. 9 shows a front perspective view of a hinge assembly according to another embodiment.
Figure 10:
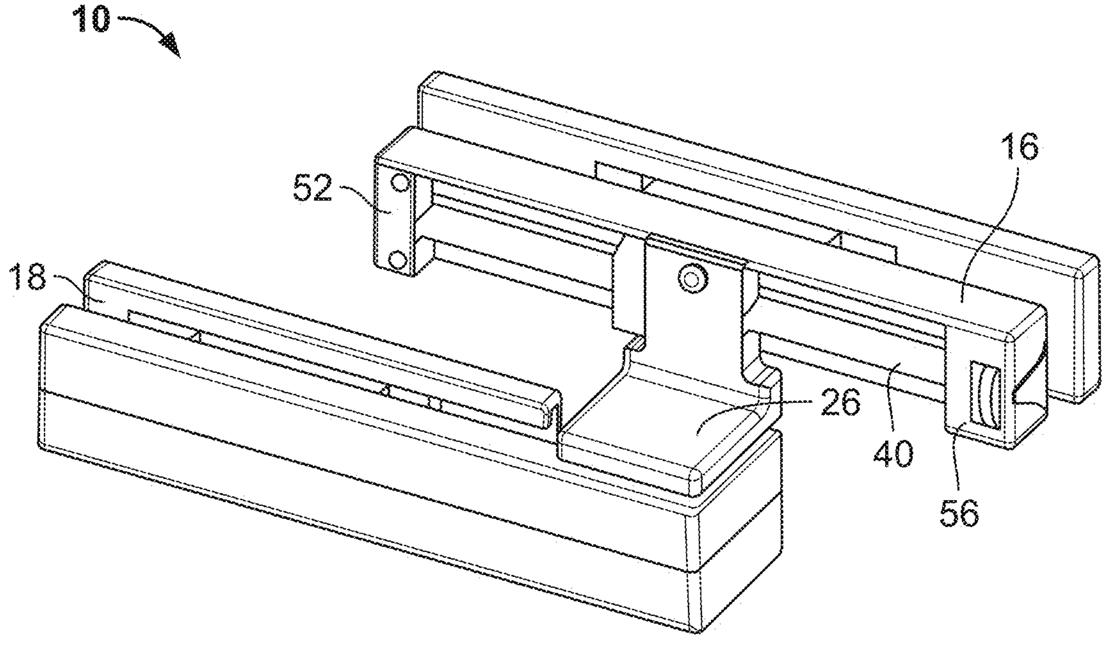
FIG. 10 shows a cutaway front perspective view of a hinge assembly of FIG. 9.
Figure 11:
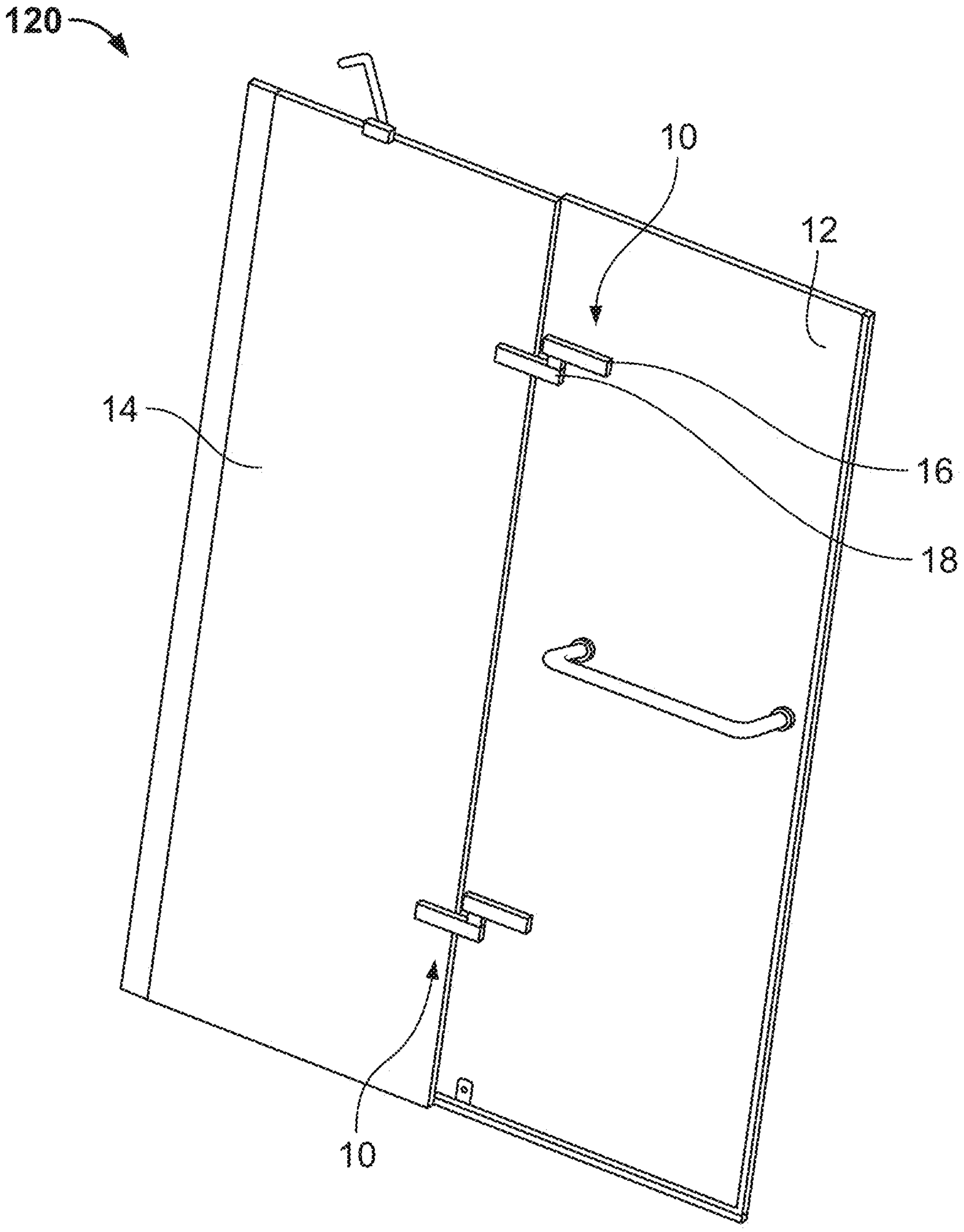
FIG. 11 shows a front perspective view of a shower enclosure assembly according to an embodiment.

Referring to FIG. 11, in another aspect, a shower door assembly 120 comprises one or more of the embodiments of the hinge assembly 10 discloses herein, such as one, two, three, four, or five hinge assemblies 10. The shower door assembly 120 comprises the glass door 12 disposed between the first backplate 82 and the first gasket plate 78. Referring to FIG. 8B, the glass door 12 may be disposed in the gap 17. The shower door assembly 120 comprises a fixed glass wall 14 disposed between the second backplate 102 and the second gasket plate 98.

Although embodiments of the disclosure have been described using specific terms, devices, and methods, such description is for illustrative purposes only. The words are words of description rather than of limitation. It is to be understood that changes and variations may be made by those of ordinary skill in the art without departing from the sprit or scope of the present disclosure, which is set forth in the following claims. It is further noted that any range provided herein provides support and a basis for any subset within that range. Further embodiments of the disclosure contain combinations, or exclusions, of different embodiments described herein.

Thus, although there have been described particular embodiments of the present invention of a new and useful hinge assembly and shower door assembly, it is not intended that such references be construed as limitations upon the scope of this invention except as set forth in the following claims.

What is claimed is:

1. A hinge assembly, comprising:

a first hinged body comprising a channel;

a pivot pin assembly comprising a pin body and a channel engagement portion extending upwardly from the pin body, the channel engagement portion configured to slideably engage the channel, the pin body including a pin extending downwardly from the pin body, the channel engagement portion including a threaded aperture extending through the channel engagement portion for adjusting the channel engagement portion laterally within the channel;

a second hinged body comprising a pin aperture, the pin aperture configured to receive the pin, wherein the first hinged body and the second hinged body are configured to hingedly pivot along a hinge axis defined by the pin when the pin is received in the pin aperture; and a first cover configured to be releasably secured with the first hinged body and the pin body.

2. The hinge assembly according to claim 1, wherein the pivot pin assembly further comprises a hollow pivot bushing configured to cooperatively receive the pin and be cooperatively received in the pin aperture.

3. The hinge assembly according to claim 2, wherein the hollow pivot bushing further comprises a cutaway portion to accommodate rotation of the pin body.

4. The hinge assembly according to claim 1, wherein the channel engagement portion includes a pin body aperture extending through the channel engagement portion, the pin body aperture being positioned perpendicular to the threaded aperture.

5. The hinge assembly according to claim 4, wherein the channel includes one or more channel apertures, and wherein the pin body aperture and the one or more channel apertures are configured to selectively align when the pin body is translated along the channel.

6. The hinge assembly according to claim 1, further comprising a first gasket plate comprising one or more gasket plate apertures;

a first backplate comprising one or more protrusions configured to be received in the one or more gasket plate apertures, the one or more protrusions comprising a protrusion aperture;

one or more fasteners configured to be disposed through the protrusion aperture and the first hinged body to releasably secure the first backplate, the first gasket plate, and the first hinged body.

7. The hinge assembly according to claim 6, further comprising a first cover plate configured to be releasably secured with the first backplate.

8. The hinge assembly according to claim 7, wherein the first cover plate and the first backplate are configured to be slideably engaged or comprise a friction fit.

9. The hinge assembly according to claim 1, wherein the second hinged body comprises a back surface comprising one or more gasket apertures.

10. The hinge assembly according to claim 9, further comprising a second gasket plate comprising one or more gasket plate apertures;

a second backplate comprising one or more protrusions configured to be received in the one or more gasket plate apertures, the one or more protrusions comprising a protrusion aperture;

one or more fasteners configured to be disposed through the protrusion aperture and the one or more gasket apertures to releasably secure the second backplate, the second gasket plate, and the second hinged body.

11. The hinge assembly according to claim 10, further comprising a second cover plate configured to be releasably secured with the second backplate.

12. The hinge assembly according to claim 11, wherein the second cover plate and the second backplate are configured to be slideably engaged or comprise a friction fit.

13. A pivot pin assembly, comprising:

a pin body;

a pin extending downwardly from the pin body; and a channel engagement wall extending upwardly from the pin body, the channel engagement wall including a threaded aperture and a pin body aperture extending perpendicularly to the threaded aperture, the pin body aperture configured to receive an alignment fastener.

14. The pivot pin assembly of claim 13, further comprising an annular portion disposed on a rear surface of the channel engagement wall.

15. The pivot pin assembly of claim 13, wherein the pin tapers inwardly as the pin extends downwardly from the pin body.

16. The pivot pin assembly of claim 13, further comprising a boss extending downwardly from the pin body.

17. The pivot pin assembly of claim 16, further comprising a hollow bushing configured to receive the pin.

18. The pivot pin assembly of claim 17, wherein the hollow bushing includes a sidewall and a cutaway portion disposed in the sidewall.

19. The pivot pin assembly of claim 18, wherein the boss slides across at least a portion of the cutaway portion as the pin is rotated within the hollow bushing.

* * * * *